Patented Jan. 23, 1940

2,188,180

UNITED STATES PATENT OFFICE 2,188,180

EXPANDED FARINACEOUS CEREAL AND PROCESS OF MAKING THE SAME

Clarence E. Felt and Louis J. Huber, Minneapolis, Minn., assignors to General Mills, Inc., a corporation of Delaware No Drawing. Application July 14, 1938,
Serial No. 219,159

6 Claims. (Cl. 99—82)

The present invention relates to a farinaceous cereal and more particularly to a process of producing such a cereal.

The primary object of our invention is to provide an edible farinaceous cereal which may be prepared for eating purposes in less time than is ordinarily required for the preparation and cooking of farinaceous cereals.

A further object of our invention is to produce a farinaceous cereal having a palatable flavor and a high nutritional value.

Another object of our invention is to provide a cereal composed principally of granular farinaceous material in which the granular structure of the farinaceous material is preserved.

A still further object of our invention is to provide an edible farinaceous cereal which contains vitamins B and G and which has a nut-like flavor imparted thereto.

These and other objects and advantages of our invention will be readily apparent from a consideration of the following detailed specification in conjunction with the appended claims.

Certain types of cereals composed primarily of farinaceous materials have heretofore been prepared by placing the material in boiling water, stirring and cooking the material in the water for a period of about 10 to 30 minutes. After cooling, the cooked cereal could then be eaten. Such a cereal and process of preparation thereof, however, was disadvantageous in that a prolonged period of cooking was required to render the cereal edible, and the cooking destroyed the granular structure of the individual particles of the farinaceous material.

Our invention is based upon the discovery that the above mentioned disadvantages may be obviated and that a palatable cereal composed mainly of farinaceous material may be prepared in a short length of time and in which the granular structure of the individual particles of farinaceous material is retained intact by treating the farinaceous material by the hereinafter described process and then taking the prepared cereal, in the proportion of about one part of cereal to three parts of boiling salt water, and stirring the cereal into the boiling salt water until the foam which is initially formed, has disappeared. The time required for mixing or stirring the cereal in the boiling water is generally about 1½ minutes. The prepared cereal absorbs water when added thereto, and after the initially formed foam has disappeared, the cereal may be cooled, and then it may be eaten.

In practicing our invention, we mix together a suitable quantity of farina (wheat middlings from which bran and wheat germ have substantially been removed) say, about 16½ pounds having a moisture content of from about 12½% to 14½%, by weight, with about 10%, by weight, of wheat middlings composed mainly of bran and about 5%, by weight, of wheat germ, which is added to the mixture to improve its flavor and to impart vitamins B and G to the final product.

The bran in the above described mixture readily gives up its moisture during a subsequent puffing operation and forms steam to increase the pressure in the puffing apparatus thereby increasing the volume of the farinaceous material when puffed and the steam thus produced tends to preserve a desirable light color in the farinaceous material, when puffed.

Furthermore, the addition of bran and wheat germ has a lubricating effect upon the particles of the farinaceous material and prevents the particles from adhering to each other to form clumps and to the interior of the puffing apparatus during the subsequent puffing operation.

The above described mixture is then placed in a suitable rotary retort or "puffing gun" which is provided with suitable heating means, such as gas burners and a closure member or lid. The retort is then heated to a temperature of about 300° F. to 340° F. while it is rotated at a speed of about 42 revolutions per minute. At the end of 7 or 8 minutes, a pressure is attained in the retort of from about 85 to 90 pounds per square inch. The lid of the retort is then opened and the mixture is discharged therefrom. The farinaceous material is thereby substantially expanded in volume as a result of its sudden discharge from the area of high pressure in the retort to an unconfined area of low pressure. For example, the original unpuffed farinaceous material has a specific gravity of .705 gram per cubic centimeter while the puffed product has a specific gravity of .54 gram per cubic centimeter.

About 7%, by weight, of flaked wheat germ (a mixture of 55% to 65%, by weight, of wheat embryo and other parts of the wheat kernel, principally bran, which has been dried to stabilize it) is added to the puffed product as produced above and mixed therewith.

It will be understood that the puffing in the puffing gun or rotary retort, only puffs or expands the farina and that the bran and wheat germ are not expanded in volume by the puffing operation.

The cereal, as produced above, may be prepared for eating by taking the prepared cereal, in the proportion of about one part of cereal to three parts of boiling salt water and stirring the cereal into the boiling salt water until the foam which is initially formed, has disappeared. After cooling, milk or cream and sugar may be added to the cereal if desired and it may be eaten.

Instead of using farina in the above mentioned mixture of ingredients, it will also be understood that "semolina" may be used. By "semolina" we include a fine granular mixture of wheat middlings made from durum wheat from which bran and wheat germ have substantially been removed. However, it will be understood that in its broadest terms our invention comprehends the use of all granular farinaceous material, which, of course, may be produced from either wheat, corn, barley, oats, or other cereals.

The initial moisture content of the mixture used in our process is of considerable importance. If the initial moisture content is less than 12½%, by weight, the cereal has an objectionable brown color after heating, while if the moisture content is over 14½% the ingredients form clumps which must be broken up by a subsequent operation. The final moisture content of the product varies with the initial moisture content and is of significance in relation to the keeping qualities of the product. Control of moisture content will permit the manufacture of a product which is resistant to oxidation of the fats that result in rancidity and also resistant to hydrolysis of fats which results in the formation of objectionable free fatty acids.

The operating temperature of the rotary retort or puffing gun is of considerable importance in successfully practicing our invention. If the temperature of the rotary retort or puffing gun is too low, the time required for the retort or gun to attain the maximum operating temperature is too long and the material puffed therein will brown. On the other hand, if the initial operating temperature of the rotary retort or puffing gun is too high, the charge of farinaceous material will adhere to the walls of the gun and burn. Therefore, an operating temperature of about 300° F. to 340° F. is proper. It will, of course, be understood that the specific operating conditions stated herein will vary considerably with the nature of the mechanical equipment used.

The initial charge of materials placed in the rotary retort or puffing gun may vary from about 10 to 20 pounds. The amount of material placed in the gun, however, will depend largely upon the size of the rotary retort or puffing gun.

The following specific example will serve to illustrate and explain our invention: A puffing gun, heated to approximately 300° to 340° F., was charged with a 16½ pound mixture of farina and 1.6 pounds of wheat middlings composed of bran and wheat germ. A cover on the gun was closed, and the gun was rotated at the speed indicated above. When the pressure in the gun had increased to approximately 85 to 90 pounds per square inch in the course of 7 to 8 minutes, the gun was discharged by tilting the same and releasing the lid or cover. The puffed product was then mixed or blended with 1.2 pounds of flaked wheat germ. This mixture was then prepared for eating, by adding the cereal in the proportion of one part of cereal to three parts of salted boiling water and stirring the cereal in the water for 1 or 2 minutes.

While our invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

We claim as our invention:

1. An edible cereal product formed from a blended, partially expanded mixture of farinaceous material, wheat germ and bran, the wheat germ serving to lubricate the bran and farinaceous material during the expansion of the farinaceous material, and the bran serving to furnish moisture which is converted into steam during the expansion of the farinaceous material thereby facilitating the expansion thereof.

2. An edible cereal product formed from a blended, partially expanded mixture of farinaceous material, bran, and wheat germ, the farinaceous material having a uniformly fragile vesicular internal structure of substantially intact cellular material, the vesicles thereof being of uniform size and distribution.

3. An edible cereal product formed from a blended, partially expanded mixture of farinaceous material, wheat germ and bran, the farinaceous material having been subjected to conditions of temperature and pressure sufficient to cause substantial expansion thereof but insufficient to expand said wheat germ and bran.

4. An edible cereal product as defined in claim 3 in which the granular structure of the farinaceous material is preserved substantially intact.

5. The process of making an edible cereal product comprising mixing farinaceous material, wheat bran and wheat germ, subjecting the mixture to a pressure substantially within the range of 85 to 90 pounds per square inch and at temperatures substantially within the range of 300° F. to 340° F., and then suddenly releasing the pressure to expand the farinaceous material but without expanding the bran and wheat germ.

6. The process of making an edible cereal product which comprises mixing farinaceous material, wheat bran and wheat germ, subjecting the mixture to a temperature and pressure sufficient to puff the farinaceous material but insufficient to puff the bran or wheat germ, suddenly releasing the pressure to puff the farinaceous material, the mixture having a moisture content of about 12½% to 14½%, the bran and wheat germ serving to prevent the particles of farinaceous material from adhering to each other and to the puffing container, and the bran readily giving up its moisture during the puffing and heating operation to form steam to increase the pressure and to preserve a light color in the farinaceous material.

CLARENCE E. FELT.
LOUIS J. HUBER.